112-67 SR
FIP7909 OR RE 10,466

4 Sheets—Sheet 1.

F. W. CROSS.

BUTTON HOLE SEWING MACHINE.

No. 10,466. Reissued Apr. 8, 1884.

Witnesses:
Walter E. Lombard.
A. S. Drisko

Inventor:
Frank W. Cross;
by N. Lombard
Attorney.

N. PETERS, Photo-Lithographer, Washington, D. C.

4 Sheets—Sheet 2.

F. W. CROSS.

BUTTON HOLE SEWING MACHINE.

No. 10,466. Reissued Apr. 8, 1884.

Witnesses:
Walter E. Lombard.
A. S. Drisko

Inventor:
Frank W. Cross,
by N. C. Lombard
Attorney.

N. PETERS, Photo-Lithographer, Washington, D. C.

67

4 Sheets—Sheet 3.

F. W. CROSS.

BUTTON HOLE SEWING MACHINE.

No. 10,466. Reissued Apr. 8, 1884.

Witnesses:

Walter E. Lombard

A. S. Drisko

Inventor:

Frank W. Cross:

by N. C. Lombard

Attorney.

N. PETERS, Photo-Lithographer, Washington, D. C.

67

4 Sheets—Sheet 4.

F. W. CROSS.

BUTTON HOLE SEWING MACHINE.

No. 10,466. Reissued Apr. 8, 1884.

Witnesses:
Walter E. Lombard.
A. S. Disk

Inventor:
Frank W. Cross:
by N. C. Lombard
Attorney.

N. PETERS, Photo-Lithographer, Washington, D. C.

UNITED STATES PATENT OFFICE.

FRANK W. CROSS, OF LYNN, MASSACHUSETTS.

BUTTON-HOLE SEWING-MACHINE.

SPECIFICATION forming part of Reissued Letters Patent No. 10,466, dated April 8, 1884.

Original No. 279,349, dated June 12, 1883. Application for reissue filed February 6, 1884.

DIVISION B.

*To all whom it may concern:*

Be it known that I, FRANK W. CROSS, of Lynn, in the county of Essex and State of Massachusetts, have invented certain new and useful Improvements in Stop-Motion Attachments for Sewing-Machines, of which the following, taken in connection with the accompanying drawings, is a specification.

My invention relates to stop-motions for sewing-machines, and is designed primarily for use upon button-hole sewing-machines, though it may be adapted to use upon all power sewing-machines, and has for its object the instantaneous stopping of the machine whenever the thread breaks; and it consists in certain novel devices and combinations and arrangements of parts, which will be best understood by reference to the description of the drawings, and to the claims to be hereinafter given.

Figure 1:
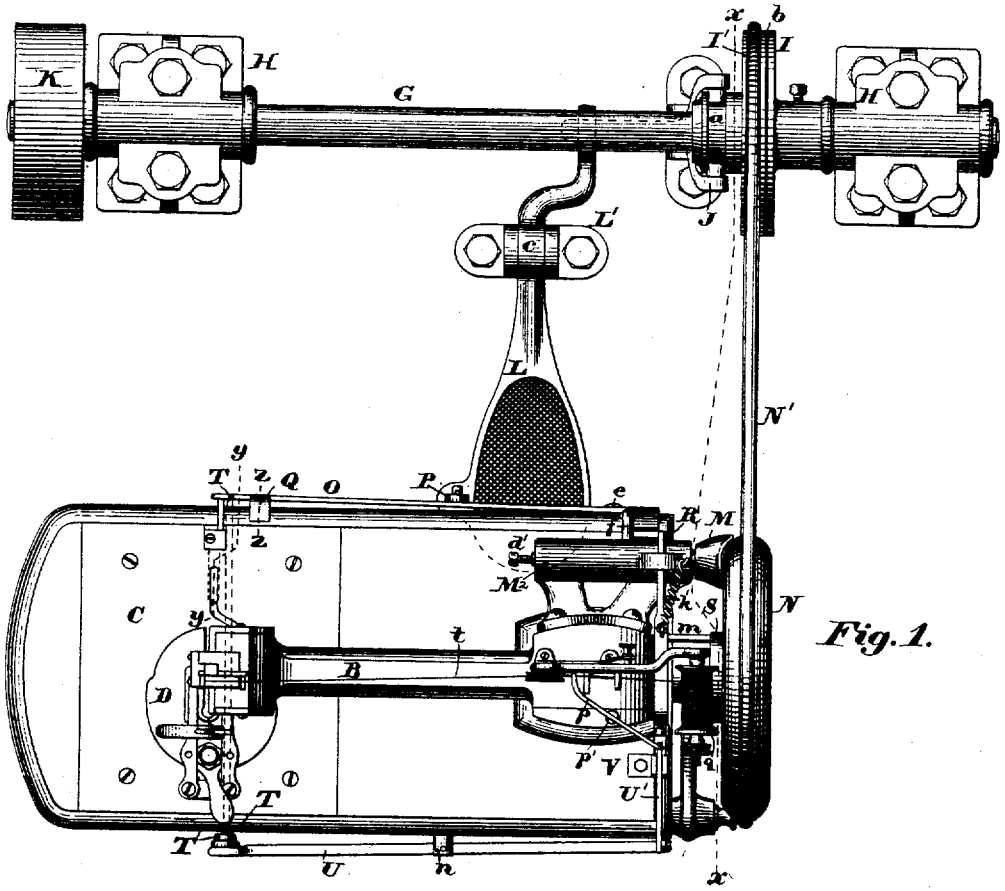
Figures 2, 9:
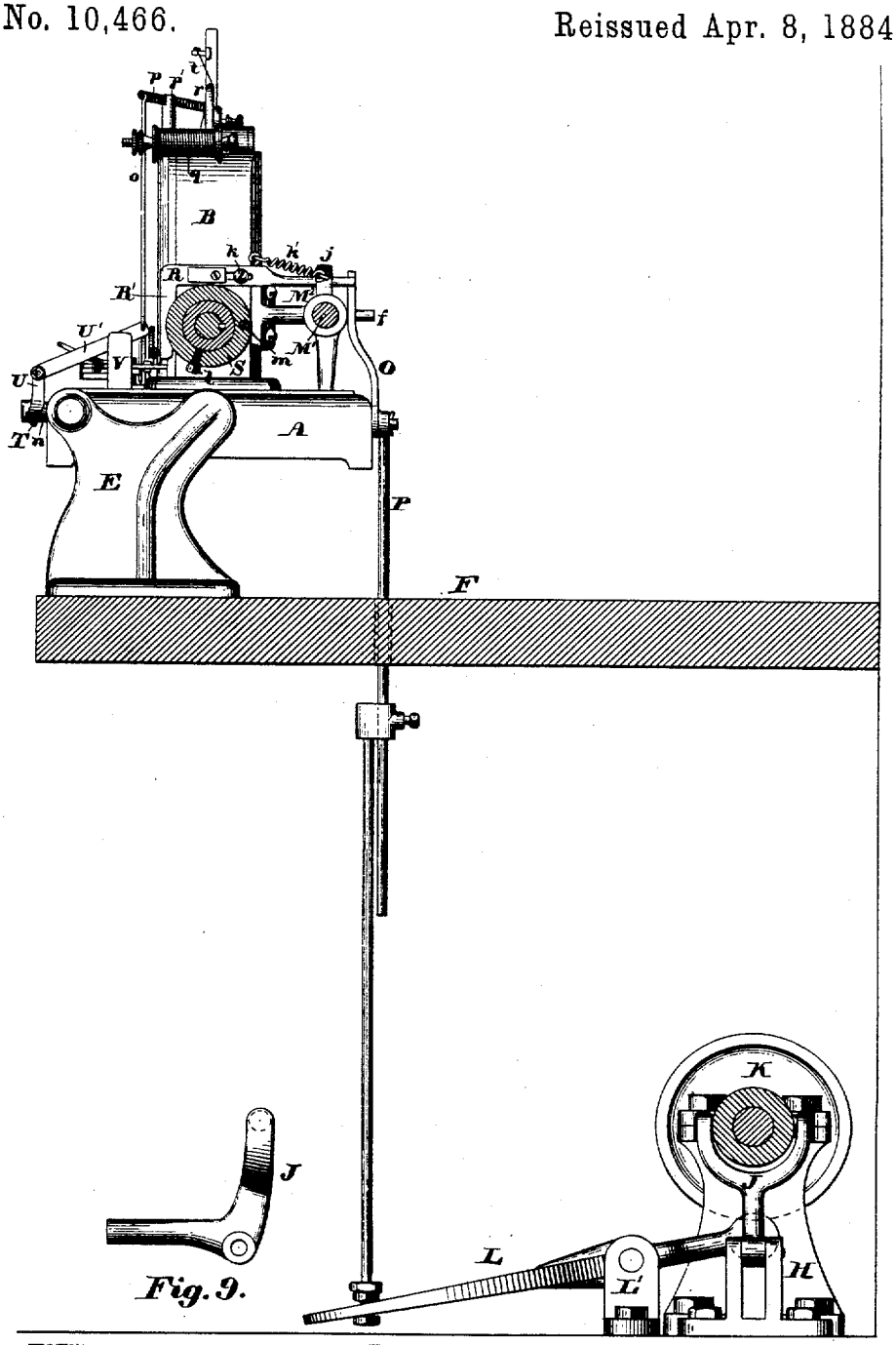
Figure 3:
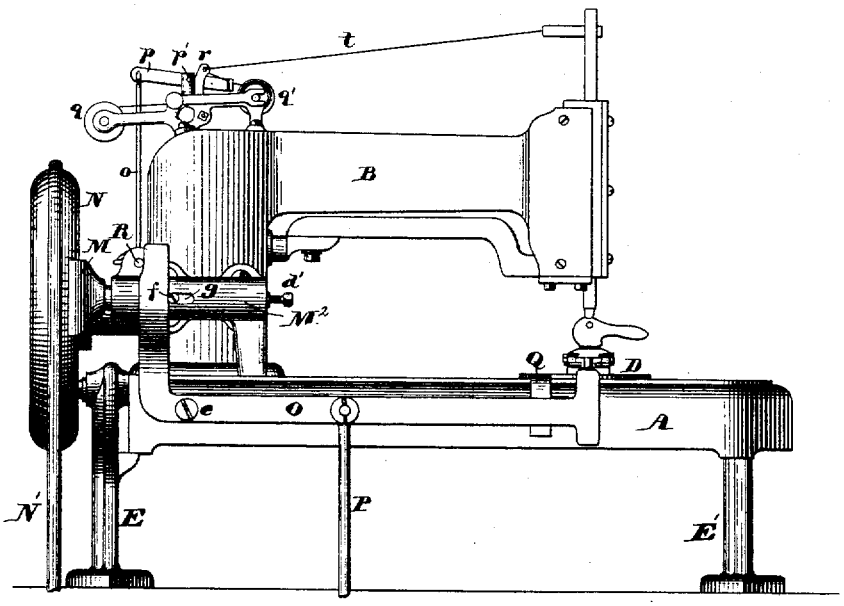
Figure 7:
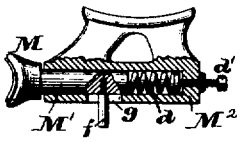
Figure 6:
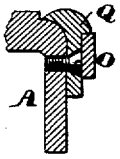
Figure 5:
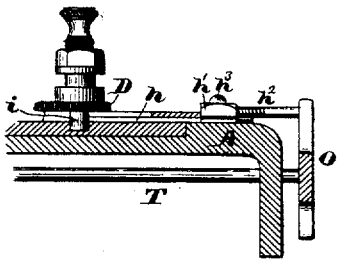
Figure 4:
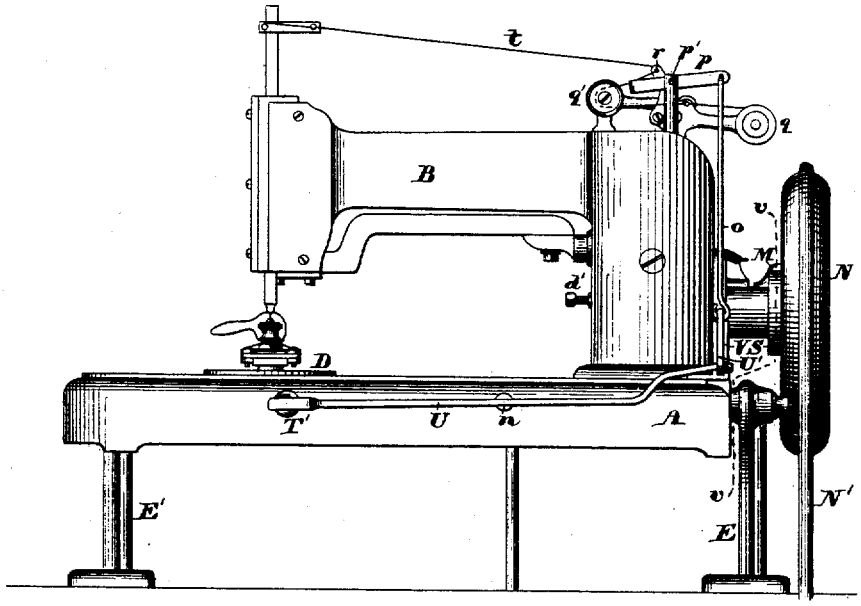
Figure 8:
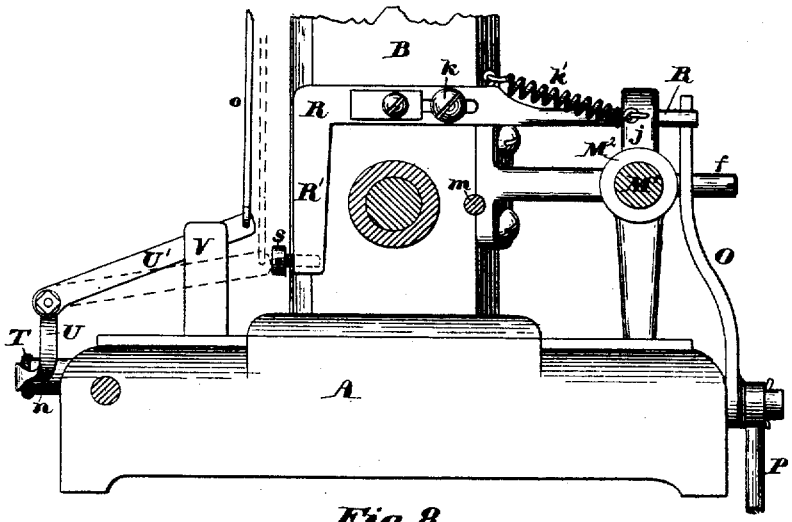

Figure 1 of the drawings is a plan of a machine embodying my invention, the bench upon which the sewing-machine is supposed to be mounted, and beneath which the counter-shaft is placed, being omitted for the purpose of the better showing the several parts of the invention. Fig. 2 is a vertical transverse section on line *x x* on Fig. 1. Fig. 3 is a rear side elevation of the sewing-machine without the counter-shaft. Fig. 4 is a front side elevation. Fig. 5 is a partial section on line *y y* on Fig. 1. Fig. 6 is a partial section on line *z z* on Fig. 1. Fig. 7 is a sectional plan of the brake-shoe and its stand. Fig. 8 is a partial sectional end elevation, drawn to an enlarged scale, the cutting-plane being on line *v v* on Fig. 4; and Fig. 9 is an elevation of the shipper-lever detached from the machine.

A is the bed or main table, B the goose-neck, C the removable work-plate, and D the work-clamping plate, of a Singer button-hole sewing-machine. The table is pivoted to the stands E and E′, which are firmly secured in the appropriate positions upon the bench F.

G is the counter-shaft, mounted in bearings in the stands H H, secured to the floor of the building beneath the bench F, and at the rear of the back edge of the table A, as shown in Figs. 1 and 2. The shaft G has secured thereto the disk I, and has loosely fitted thereon, in near proximity to said disk I, the grooved pulley I′, provided with a circumferential groove, *a*, in its hub, with which the forked end of the elbow shipper-lever J engages, as shown, a friction-pad in the form of a leather disk, *b*, being placed between the disk I and the pulley I′ as a means of revolving the pulley I′ when it is pressed hard against the disk I by the action of the shipper-lever J. Motion is imparted to the shaft G by means of the pulley K and a suitable belt (not shown) leading therefrom to a main shaft or other prime mover.

L is a treadle-lever pivoted at *c* to the stand L′, and connected at its rear end to the horizontal arm of the shipper-lever J, and having its front end in a convenient position to be acted upon by the operator's foot while setting at the machine and manipulating the work to be acted upon with his or her hands.

The fly-wheel N has formed in its rim a groove to receive the belt N′, which leads from the pulley I′, and by which the wheel N is revolved.

M is a brake-shoe shaped to fit the side of the rim of the fly-wheel N, and mounted by its horizontal shank M′ in the stand M², secured to the back side of the goose-neck B, and pressed into contact with the wheel N by the spring *d*, the tension of which may be regulated by means of the set-screw *d′*, as shown in Fig. 7.

O is an elbow-lever pivoted at *e* to the back edge of the table A, with its short arm projecting upward in a position to bear against the side of the pin *f*, set in the side of the shank of the brake-shoe M, and projecting through the slot *g*, formed in the stand M², all as shown in Fig. 3. The lever O is made preferably of sheet-steel, so that it may readily be sprung horizontally, and has the end of its long or horizontal arm arranged to engage with the catch Q, when depressed, to remove the brake-shoe from contact with the wheel N, said catch being secured to the rear edge of the table A, as shown in Figs. 1, 3, and 6. The long arm of the lever O has pivoted thereto one end of the connecting-rod P, the other end of which is pivoted to the treadle-lever L, as shown in Fig. 2.

R is a locking-bolt having its bearings in the ear *j* of the stand M², and on the screw *k*, set in the goose-neck B, said bolt being provided with the downwardly-projecting arm R′ in front of the shaft of the fly-wheel N, as shown in Fig. 8. The rear end of the bolt R is so arranged relative to the vertical arm of the lever O that when the long arm of said lever is depressed by the treadle so as to engage with the catch Q, and the brake-shoe has been removed from contact with the fly-wheel, said bolt will be moved backward by the spring $k'$, till its rear end is interposed in the vibratory path of the short arm of said lever O, so as to prevent the brake-shoe from being moved into contact with the fly-wheel, when the lever O is released from the catch Q, until the bolt R is withdrawn from the path of the lever O.

S is a ring or collar adjustably secured to the hub of the fly-wheel or its shaft by the set-screw $l$, and carrying the arm or pin $m$, projecting therefrom parallel to the axis of revolution of the wheel N, and adapted to strike the arm R′ of the bolt R at each revolution of said wheel, and move said bolt toward the front of the machine a sufficient distance to remove its rear end from the path of the vertical arm of the lever O, said collar and pin being in effect a cam for moving the bolt R R′. The ring or collar S and its arm or pin $m$ may be so adjusted about its axis of revolution as to accurately time the movement of the bolt R, so as to stop the machine when the needle has just left the work on its upward stroke after having descended through the same.

In some button-hole sewing-machines the fly-wheel N is mounted directly upon the needle-bar-operating shaft, in which case, in order to apply my improvement, the collar S and its pin $m$ would of necessity have to be applied to a different shaft from that on which the fly-wheel is mounted, as said collar and pin should make only one revolution to two revolutions of the needle-bar-operating shaft.

All of the parts hereinbefore described are shown and described in another application of mine, filed in the United States Patent Office December 1, 1883, and numbered 113,342, of which this application is a division, said parts being described and shown in said other application as in combination with and operated by the work-clamping mechanism D for stopping the machine at the end of the button-hole, and certain claims are made in said other application covering said combinations and operations; but in working button-holes in leather work, or in sewing upon leather, it is very desirable that the necessity for sewing twice over the same track should be avoided as much as possible, on account of the danger of spoiling the work by cutting the stock by too many perforations. This is likely to occur every time that the thread breaks, and hence the necessity of a stop-motion that may be operated by the breaking of the thread and adapted to stop the machine when the needle has just left the work on its upward stroke after having descended through the same. To accomplish this I mount the rod T in bearings in the front and rear ribs of the table A, with its rear end in contact with the inner surface of the lever O when it is engaged with the catch Q, and provided at its front end with the knob T′, upon the front face of which bears one end of the lever U, pivoted at $n$ to the front edge of the table A, and having pivoted to its other end the link U′ at right angles thereto, and so arranged that its inner end may be moved vertically in a plane corresponding to the plane of movement of arm R′ of the bolt R. The inner end of the link U′ is connected by the link $o$ to one end of the lever $p$, pivoted at $p'$, and provided at its opposite end with an eye, through which the thread from spool $q$ passes on its way from the tension-wheel $q'$ to the eye in the end of the pivoted arm $r$, as shown in Fig. 4.

In the lower end of the arm R′ of the bolt R is fitted the screw $s$ in such a manner that it may be adjusted so that the outer end of its head may be at a greater or less distance from the axis of motion of the pin $m$ to insure its moving the link U′ the desired distance to unlock the lever O from the catch Q through the medium of the lever U and rod T.

The inner end of the link U′ is guided in its upward and downward movements by the slotted standard V, and when the machine is properly threaded its inner end is maintained in the elevated position shown in Figs 2 and 8 out of the path of the screw-head $s$; but if at any time in the progress of the work the thread $t$ breaks or becomes slack by reason of the breakage of the needle, the inner end of the link U′ will drop of its own weight to the bottom of the slot in the stand V, as indicated in dotted lines in Fig. 8, when its inner will be directly in the path of the screw-head $s$, and at the next movement of the bolt R, caused by the contact therewith of the pin $m$, said screw-head will strike the link U′, and, moving it endwise, will thus cause the lever U to be vibrated about its fulcrum and push the rod T toward the rear of the machine, thereby releasing the lever O from engagement with the catch Q, and permitting the brake-shoe M to be thrown into contact with the rim of the fly-wheel N at the same instant that the pulley I′ is moved away from the disk I, and thus rendered inoperative, and the needle-bar is instantly brought to a standstill.

I have illustrated this invention as applied to a button-hole sewing-machine; but it may with equal propriety be applied to ordinary sewing-machines, as it is not dependent upon the movement of the work-clamp, and hence I do not wish to be limited to its use on button-hole sewing-machines.

The operation of my invention will be readily understood from the foregoing, and therefore need not be further described here.

I do not claim in this application anything herein shown and described that is claimed in my other application hereinbefore referred to; but

What I claim as new, and desire to secure by Letters Patent of the United States, is—

1. The combination, in a sewing-machine, of a spring-pressed brake-shoe, a lever for retracting said shoe, a catch for locking said lever, a bolt for locking the brake-shoe in a retracted position, a cam or other device for retracting said bolt at regular intervals, a push-rod adapted to disengage the brake-shoe-retracting lever from its catch, a system of levers connecting said push-rod with the thread that supplies the needle, and arranged and adapted to be inoperative while the thread remains taut, and to be acted upon to move said push-rod endwise by the retractive movement of the locking-bolt whenever the thread breaks, substantially as and for the purposes described.

2. The combination of the brake-shoe M, the lever O, the catch Q, the locking-bolt R R′, the adjustable screw *s*, the cam S *m*, the rod T, the levers U *p*, the link U′, and rod *o*, all arranged and adapted to operate substantially as and for the purposes described.

3. The combination, in a sewing-machine, of a fly-wheel, a brake-shoe arranged to engage with said fly-wheel, and to be pressed thereon by a spring, and to be retracted by the operator, a device for automatically locking said shoe in its retracted position, mechanism for automatically releasing said brake-shoe independently of the movement of the work-clamp, a mechanism connecting said locking device with a thread-guide, and adapted to be acted upon by said releasing mechanism to release the brake-shoe and stop the machine when the thread breaks, substantially as and for the purposes described.

Executed at Boston, Massachusetts, this 4th day of February, A. D. 1884.

FRANK W. CROSS.

Witnesses:
N. C. LOMBARD,
WALTER E. LOMBARD.